United States Patent
Turner, Jr. et al.

(10) Patent No.: US 7,548,927 B2
(45) Date of Patent: Jun. 16, 2009

(54) ABSTRACTED METADATA POLICY COMPONENT AND RELATED ARCHITECTURE

(75) Inventors: Richard S. Turner, Jr., Woodinville, WA (US); David Albert, Woodinville, WA (US); Eric S. Vandenberg, Seattle, WA (US); Peter A. Gurevich, Woodinville, WA (US); Robert A. Wlodarczyk, Redmond, WA (US); Robert Earl Sinclair, II, Sammamish, WA (US); Thomas W. Olsen, Issaquah, WA (US); Tomasz S. M. Kasperkiewicz, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 345 days.

(21) Appl. No.: 11/112,765

(22) Filed: Apr. 21, 2005

(65) Prior Publication Data
US 2006/0242141 A1 Oct. 26, 2006

(51) Int. Cl.
*G06F 17/30* (2006.01)
(52) U.S. Cl. .............. 707/101; 707/5; 707/200
(58) Field of Classification Search .......... 707/2–5, 707/100, 1, 101, 200
See application file for complete search history.

(56) References Cited

U.S. PATENT DOCUMENTS

| | | | |
|---|---|---|---|
| 2002/0143976 A1 | 10/2002 | Barker et al. | |
| 2003/0028896 A1* | 2/2003 | Swart et al. | 725/127 |
| 2004/0139102 A1 | 7/2004 | Vierich et al. | |
| 2005/0050068 A1 | 3/2005 | Vaschillo et al. | |
| 2005/0203920 A1* | 9/2005 | Deng et al. | 707/100 |

OTHER PUBLICATIONS

Cover, Robin; "Extensible Metadata Platform"; article from: Cover Pages Hosted by OASIS, San Jose, California, USA. Sep. 24, 2001. http://xml.coverpages.org/XMP-Announce.html.

* cited by examiner

*Primary Examiner*—Cheryl Lewis
(74) *Attorney, Agent, or Firm*—Workman Nydegger

(57) ABSTRACT

A method and architecture for reading and updating metadata. A policy component is arranged to receive a request to read or update metadata that may include metadata from a plurality of standards. Each metadata format potentially includes a field corresponding to the request. The policy component determines which fields to read or update in satisfying the request by consulting a repository. The repository includes mappings that map information included in the request (e.g., a path) to locations in the metadata corresponding to the request. The policy component uses the locations to read or update the metadata.

20 Claims, 12 Drawing Sheets

ABSTRACTED METADATA POLICY COMPONENT AND RELATED ARCHITECTURE

FIELD OF THE INVENTION

The invention relates generally to computers, and more particularly to metadata.

BACKGROUND

Files may have metadata associated therewith. Metadata is information about a file that helps describe the file, but is independent of the file itself For example, metadata may include information about a file such as author, title, manager, company, category, comments, creation date, and any other data about the file. Some metadata applies to almost all files while other metadata is specific to the type of file. For example, most files have author and subject as metadata while image files may also include shutter speed, camera model, equipment make, metering mode, and the like. Typically, the metadata is not needed to display the file, but in some cases it is. For example, metadata for an image may include width, height, and bit depth, This metadata may be needed to properly display the image.

Some files have metadata of various standards associated with or embedded in them. For example, an image file may be associated with Exchangeable Image File Format (EXIF), International Press Telecommunications Council (IPTC), and Extensible Metadata Platform (XMP) metadata. Each type of metadata associated with a file may or may not have various pieces of information about the file (e.g., author, create date, and so forth).

What is needed is a method and system for reading the various pieces of information contained in various metadata schemas that are associated with a file and determining which metadata entry should take priority and updating the metadata to keep it consistent across the multiple schemas.

SUMMARY

Briefly, the present invention provides a method and architecture for reading and updating metadata. A policy component is arranged to receive a request to read or update metadata that may include metadata from a plurality of standards. Each metadata format potentially includes a field corresponding to the request. The policy component determines which fields to read or update in satisfying the request by consulting a repository. The repository includes mappings that map information included in the request (e.g., a path) to locations in the metadata corresponding to the request. The policy component uses the locations to read or update the metadata.

Other aspects will become apparent from the following detailed description when taken in conjunction with the drawings, in which:

DETAILED DESCRIPTION

Exemplary Operating Environment

Figure 1:
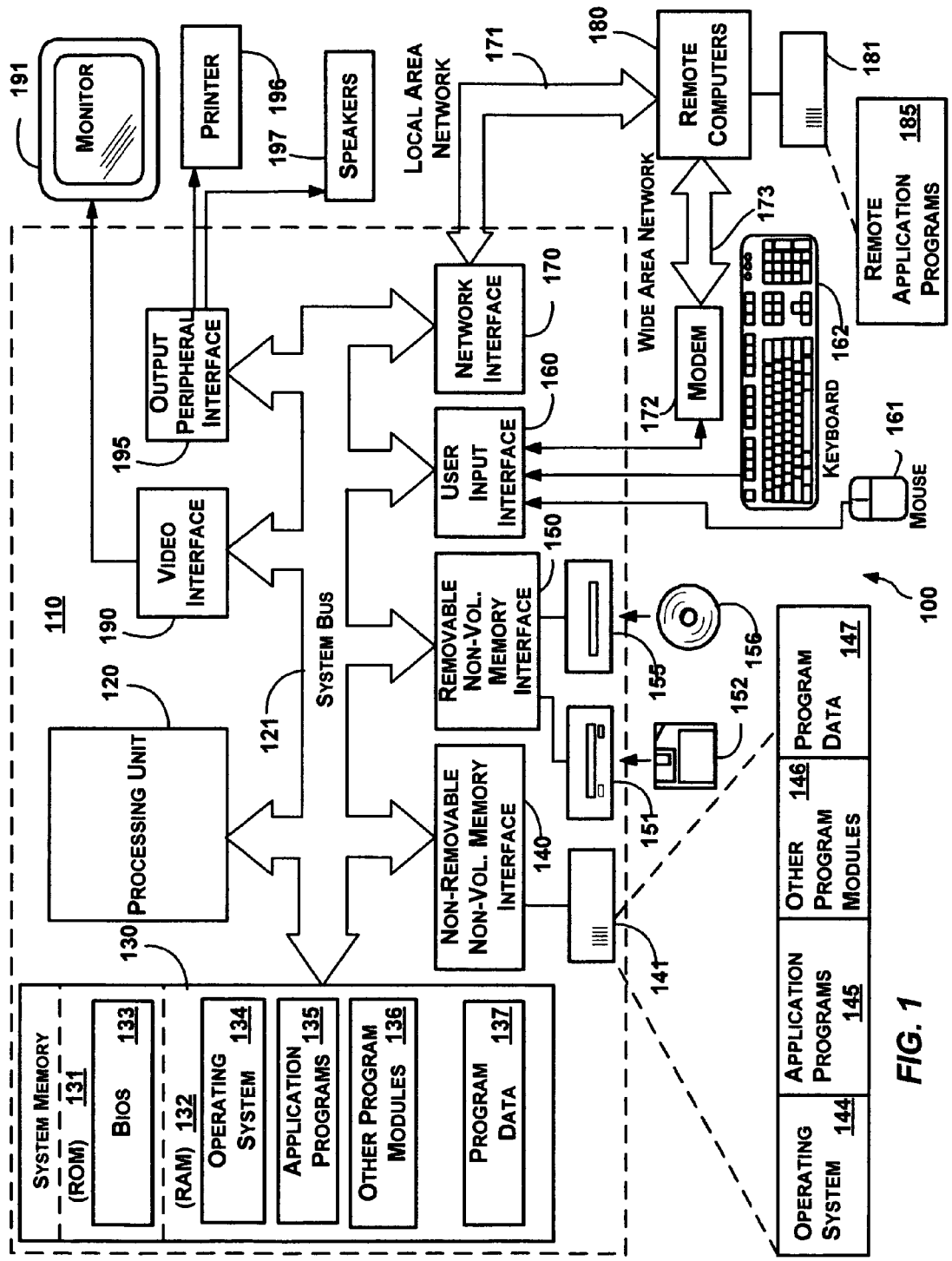
FIG. 1 is a block diagram representing a computer system into which the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microcontroller-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general-purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus also known as Mezzanine bus, PCI Express (PCI-E) bus, and accelerated graphics port (AGP) bus.

Computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules, and other data for the computer 110. In FIG. 1, for example, hard disk drive 141 is illustrated as storing operating system 144, application programs 145, other program modules 146, and program 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, a touch-sensitive screen of a handheld PC or other writing tablet, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Metadata Architecture

Figure 2:
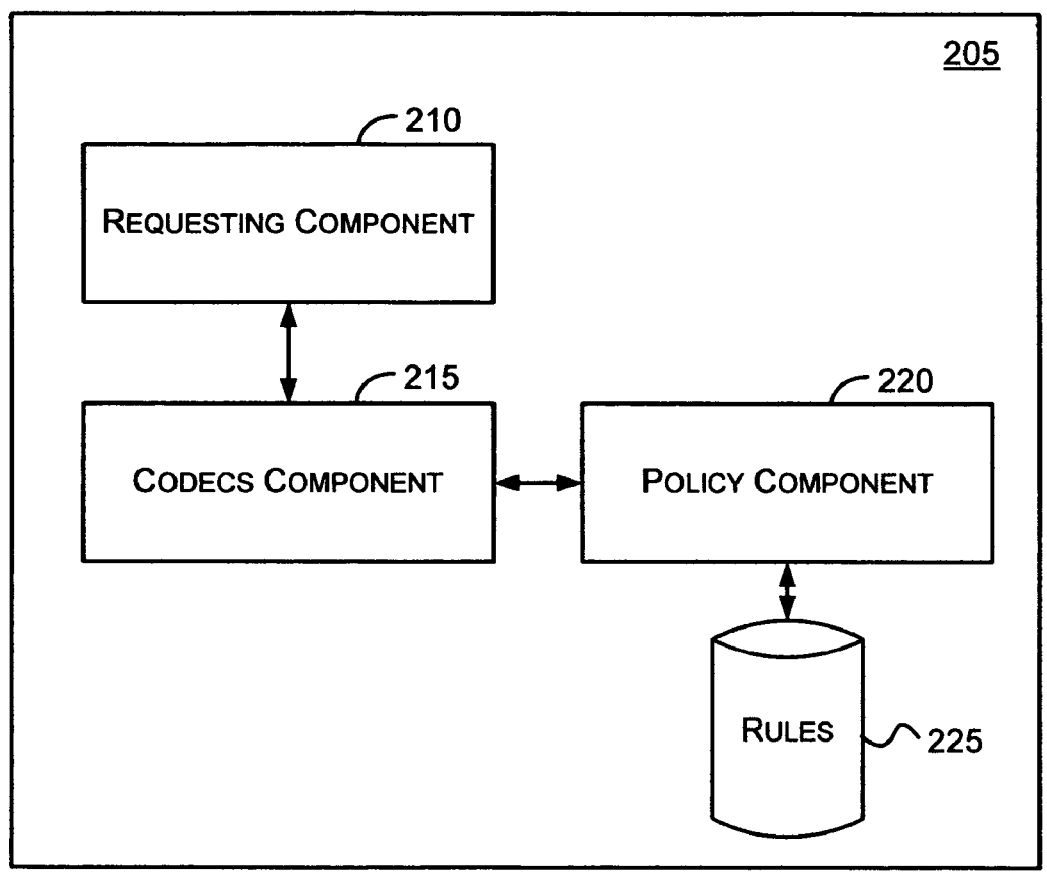
FIG. 2 is a block diagram representing an exemplary environment in which the present invention may operate in accordance with various aspects of the invention.

FIG. 2 is a block diagram representing an exemplary environment in which the present invention may operate in accordance with various aspects of the invention. The environment 205 includes a requesting component 210, a codecs component 215, a policy component 220, and a rules database 225.

Each of the components 210, 215, and 220 may comprise code that executes on or hardware associated with a computer, such as the computer system 110 of FIG. 1, and may comprise a conventional application program, an operating system component or utility, a control, an application programming interface (API), a hardware device, a combination of the above, and so forth.

Figure 3A:
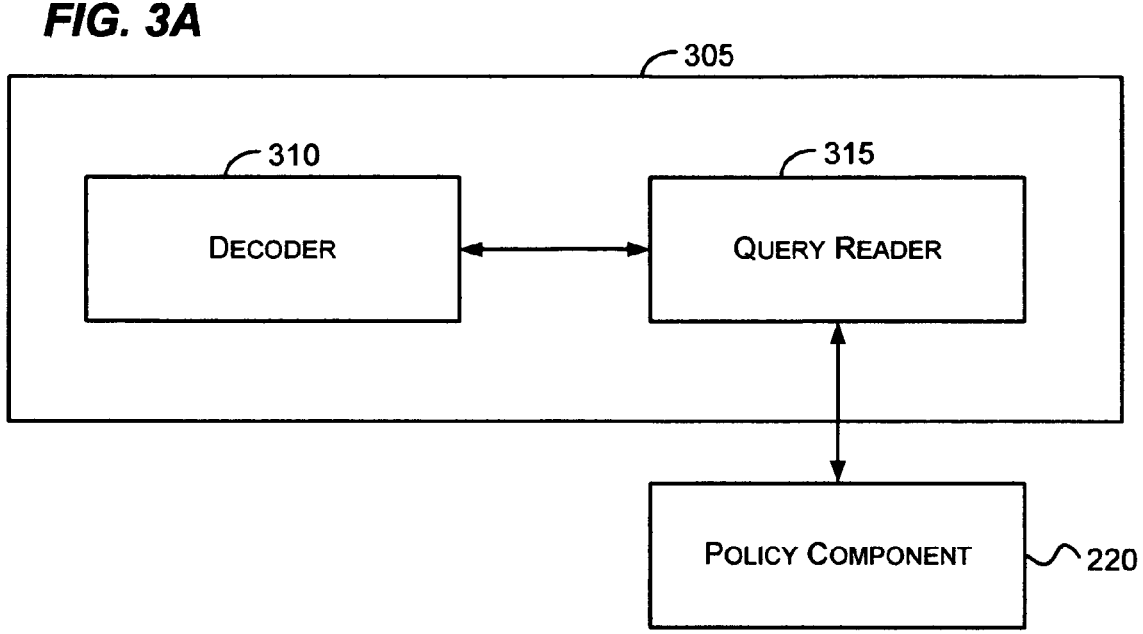
FIGS. 3A and 3B are block diagrams generally representing readers and writers coupled to a policy component in accordance with various aspects of the invention.
Figure 3B:
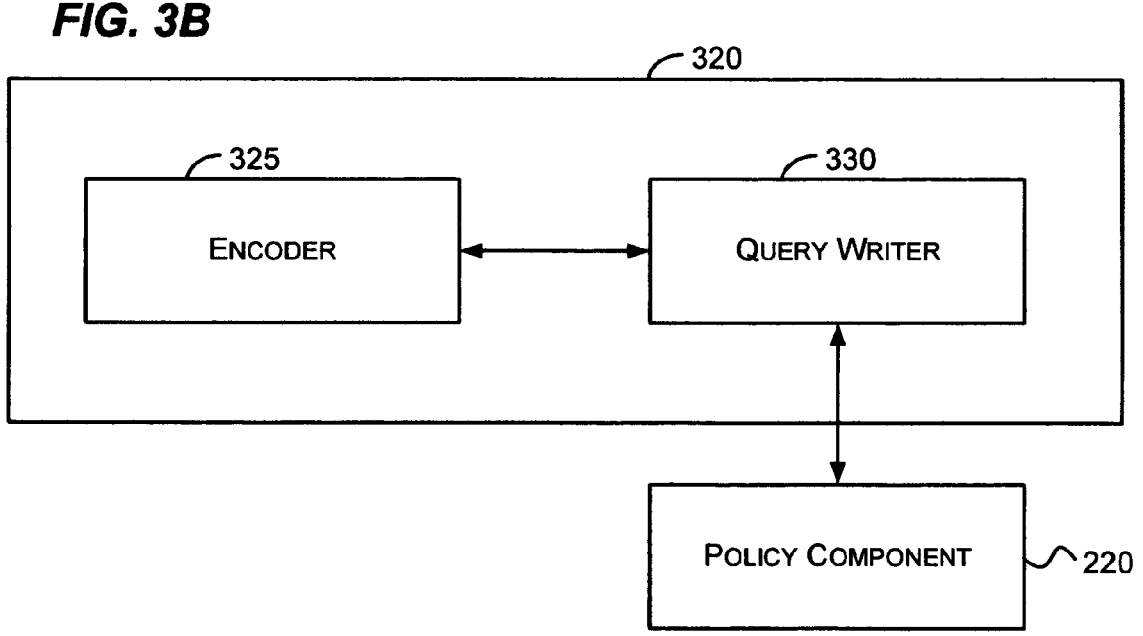

In one embodiment, the requesting component 210 instantiates a query reader or writer by communicating with the codecs component 215 (as described in more detail in conjunction with FIGS. 3A and 3B). The requesting component 210 may then use the query reader or writer to obtain or update metadata associated with a file, such as an image file.

The policy component 220 may use rules and other data from the rules database 225 to determine how to read and write metadata as described in more detail below.

The rules database 225 comprises a repository into which rules may be stored and accessed regarding reading and writing metadata. The rules database 225 may include a mapping that maps a non fully-qualified path (defined below) to one or more fully-qualified paths (defined below). Thus, for example, "author" may map to "\ifd\{315}" in an IFD type of metadata and may also map to "\iptc\artist" in an IPTC type of metadata.

The mappings included in the rules database 225 may be fixed or updateable (e.g., through system updates, user modification, new component installation, and so forth). In an update, additional metadata types may be mapped to the rules database 225.

The rules database 225 may include rules that indicate which metadata has priority when reading a metadata field. For example, if file has EXIF metadata and IPTC metadata associated with it, the rules may indicate that the EXIF metadata should be returned in response to requests for certain metadata fields and that the IPTC metadata should be returned in response to requests for other metadata fields.

The rules database 225 may also include rules that indicate what should happen on a write to metadata. In one embodiment, the rules may specify that all metadata associated with a non fully-qualified path is updated. For example, if a file is associated with EXIF and IPTC metadata, the rules may specify that the EXIF, IPTC, XMP, and any other metadata associated with the path that is specified by the rules be updated, created, and/or deleted (hereinafter collectively referred to as "updated").

In another embodiment, the rules may specify that only existing metadata associated with a path is updated. For example, if a file is associated with EXIF and IPTC metadata, the rules may specify that the EXIF and IPTC metadata be updated in response to a request update metadata associated with a path.

In another embodiment, the rules may specify that only metadata of one type be updated in response to a request to update metadata associated with a path and that other metadata fields of other metadata types that are associated with the path be deleted. For example, if a file is associated with EXIF and IPTC metadata, the rules may specify that the EXIF metadata be updated and the IPTC metadata be deleted in response to a request to update metadata associated with a path.

Furthermore, the rules may also specify that all the requirements of a particular metadata type be complied with in updating a metadata field. For example, a specification for XMP metadata may require that certain other fields be updated in whenever a certain part of the XMP metadata is updated.

The components 210, 215, and 220 and the rules database 225 may reside on the same computer or may be distributed over two or more computers.

FIGS. 3A and 3B are block diagrams generally representing readers and writers coupled to a policy component in accordance with various aspects of the invention. If a decoder/query reader pair 315 does not exist, a decoder 310 and a query reader 315 may be instantiated upon demand by a component (e.g., requesting component 205 of FIG. 2). Similarly, if an encoder/writer pair 320 does not exist, an encoder 325 and a query writer 330 may be instantiated upon demand. Note that more than one query reader and/or query writer may be associated with a single instance of the encoder 325 or the decoder 310. Thus, if an encoder 325 exists, and a component wants to write to a file, the component may instantiate the query writer 325 330, which is then associated with the encoder 325.

The decoder 310 may include code and/or hardware that enables it to read data written in a particular format (e.g., XMP, EXIF, IPTC, and the like). The query reader 315 may navigate the underlying metadata included in the data to obtain fields of the metadata. Similarly, the encoder 325 may include code and/or hardware that enables it to write data of a particular format while the query writer 330 may navigate the underlying metadata included in the data to update fields in the metadata.

The query reader 315 and query writer 330 may expose an interface that allows a component to request a field in the metadata. In one embodiment, this interface allows the component to specify a path to the field in a fully-qualified or non fully-qualified manner. For example, the component may pass a string such as "/ifd/exif/{150}." The symbol "/" may specify the root of the metadata, while "ifd" may specify an image file directory block. The term "exif" indicates that the metadata is formatted in EXIF format. The last part of the string (e.g., "{150}") may comprise a tag that identifies a field in the EXIF metadata. A path starting with a "/" is sometimes referred to as a fully-qualified path, while a path that does not start with a "/" is sometimes referred to as a non fully-qualified path.

Figure 4:
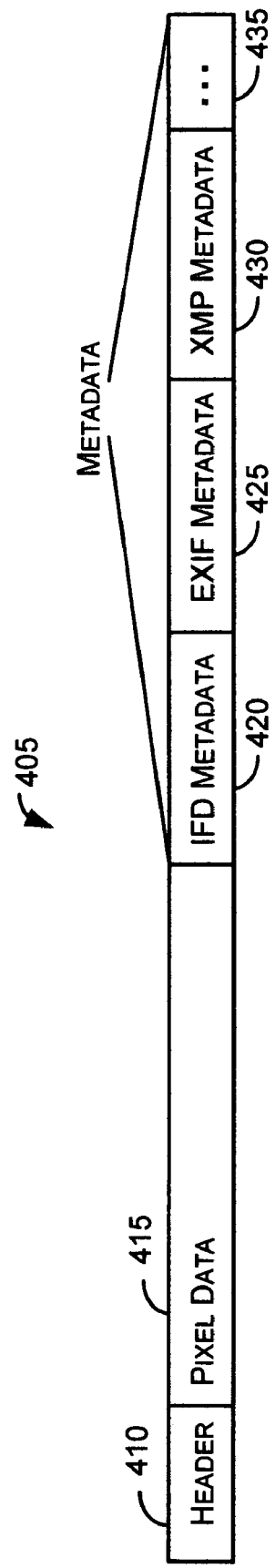
FIG. 4 is a block diagram generally representing an exemplary data structure or container that may be used to represent an image and its metadata in accordance with various aspects of the invention.

FIG. 4 is a block diagram generally representing an exemplary data structure or container that may be used to represent an image and its metadata in accordance with various aspects of the invention. The exemplary data structure 405 may include header information 410, pixel data 415, IFD metadata 420, EXIF metadata 425, XMP metadata 430, and other metadata 435. There may be more than one block of pixel data 415 and different metadata may be associated with each pixel block. In addition, the metadata may be located anywhere in the file such as just after the header information 410. Furthermore, more, fewer, or different metadata may be included without departing from the spirit or scope of the invention. The size of the elements depicted does not generally represent the size that each element may be. For example, a vast majority of the data in the container 405 may be the pixel data 415.

The IFD metadata 420 may include pointers or indexes into the metadata elements (e.g., the EXIF metadata 425, the XMP metadata 430, the other metadata 435, and other portions of the IFD metadata 420).

Returning to FIGS. 3A and 3B, if a path is sent to query reader 315 or the query writer 330 that is not a fully-qualified path (e.g., does not start with "/"), the query reader or writer, as the case may be, passes the path to the policy component 220. For example, if the component requests to read or write to a metadata field associated with a non fully-qualified path of "Author," the query reader or writer passes the path to the policy component 220.

The policy component 220 may then find the appropriate metadata field or fields and return the data associated with one field (e.g., if the request is to obtain a metadata field associated with the non fully-qualified path) or update one or more fields (e.g., if the request is to update metadata fields associated with the non fully-qualified path).

Figure 5:
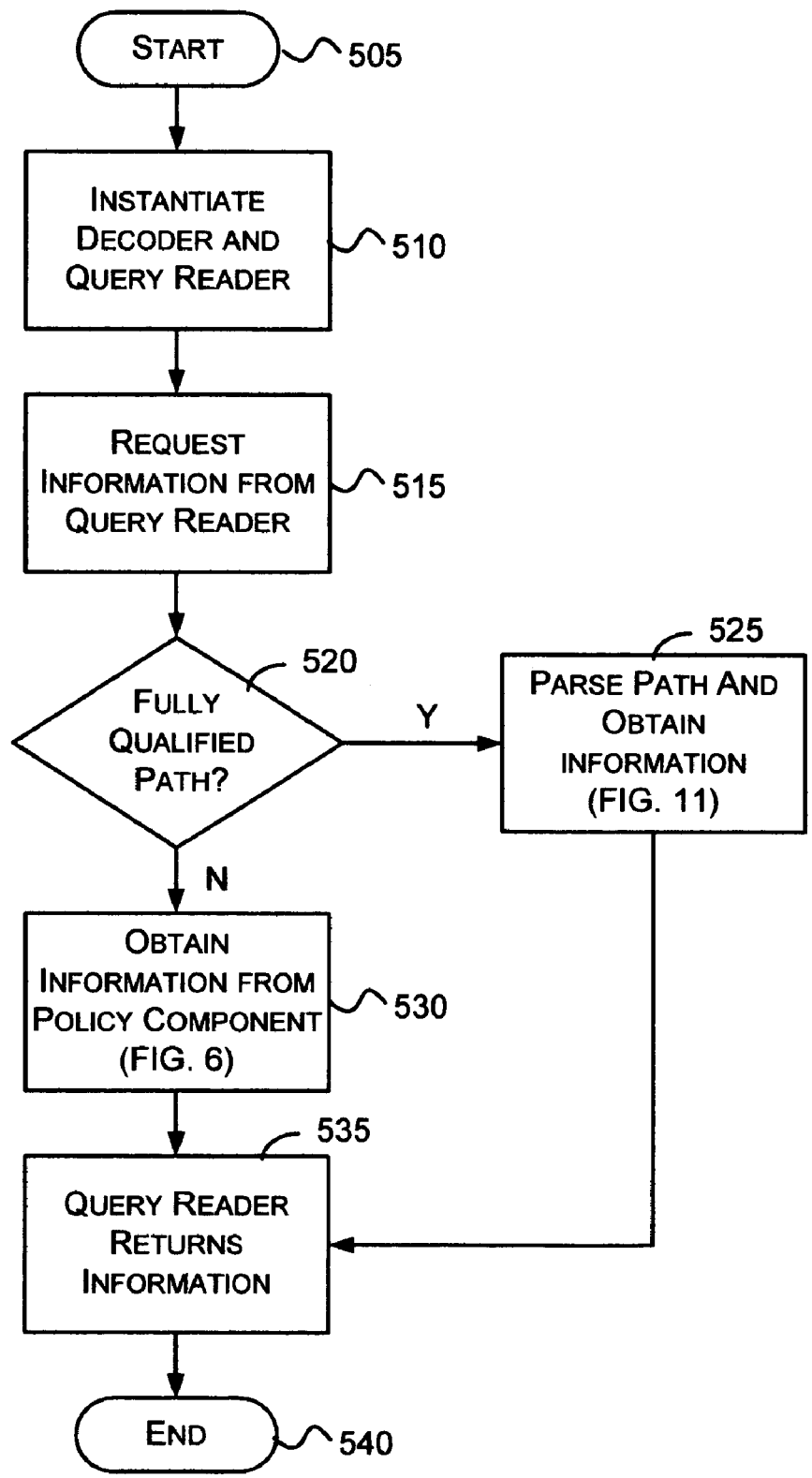
FIG. 5 is a flow diagram generally representing exemplary actions that may occur in obtaining metadata information in accordance with various aspects of the invention.

FIG. 5 is a flow diagram generally representing exemplary actions that may occur in obtaining metadata information in accordance with various aspects of the invention. At block 505, the actions begin.

At block 510, a decoder and query reader are instantiated (if they do not exist). For example, referring to FIG. 2, the requesting component 210 may instantiate the decoder by calling the codecs component 215 and then instantiate the query reader 315 of FIG. 3A by calling the decoder 310.

At block 515, the component requests information from the query reader and passes a path thereto. At block 520, the query reader determines if the path is a fully-qualified path, and, if so, processing branches to block 525. If the path is a non fully-qualified path, processing branches to block 530.

Figure 11:
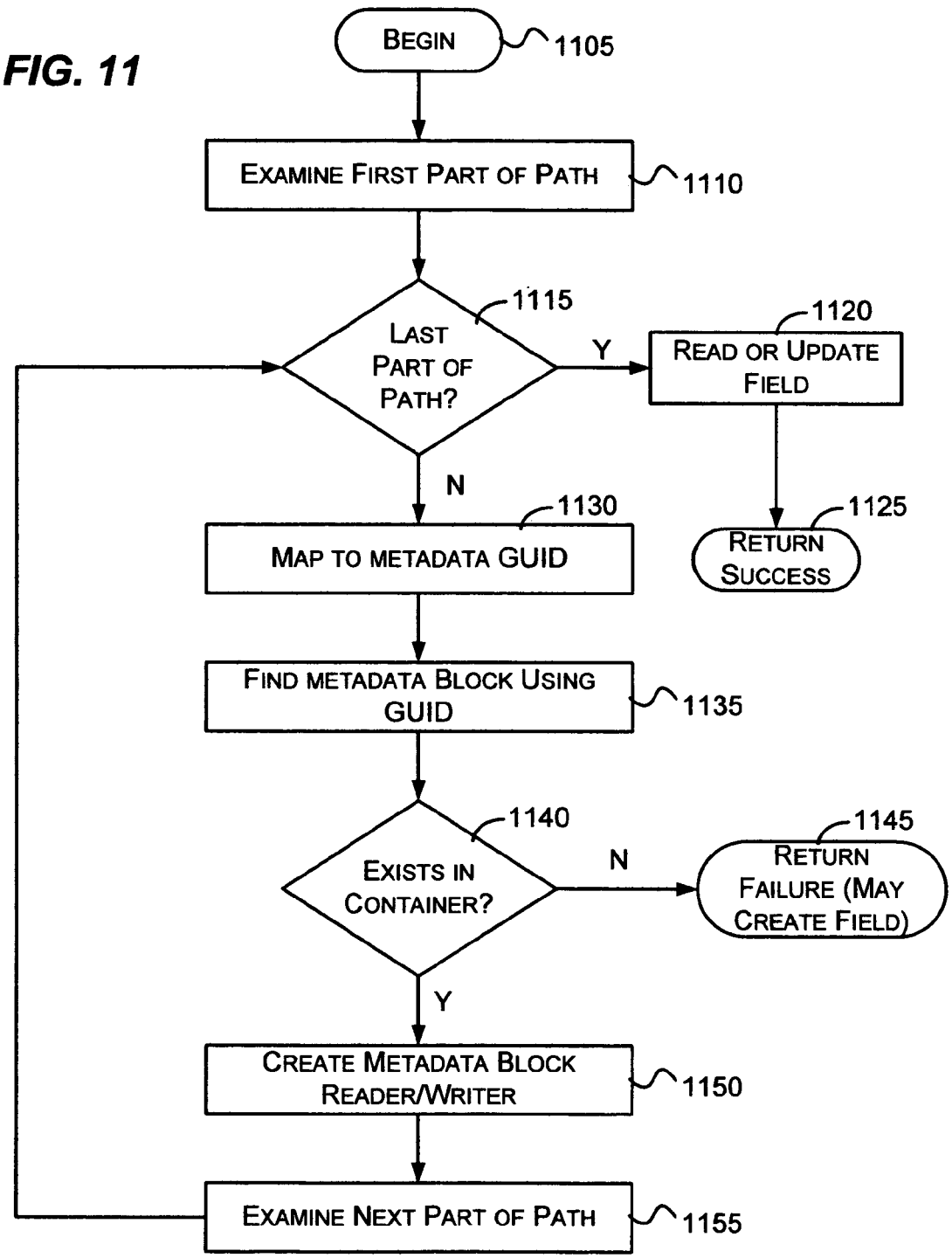
FIG. 11 is a flow diagram corresponding to block 525 of FIG. 5 and block 725 of FIG. 7 generally representing actions that may occur in reading or updating metadata via fully-qualified path.

At block 525, the query reader parses the path to obtain the information as described in more detail in conjunction with FIG. 11.

Figure 6:
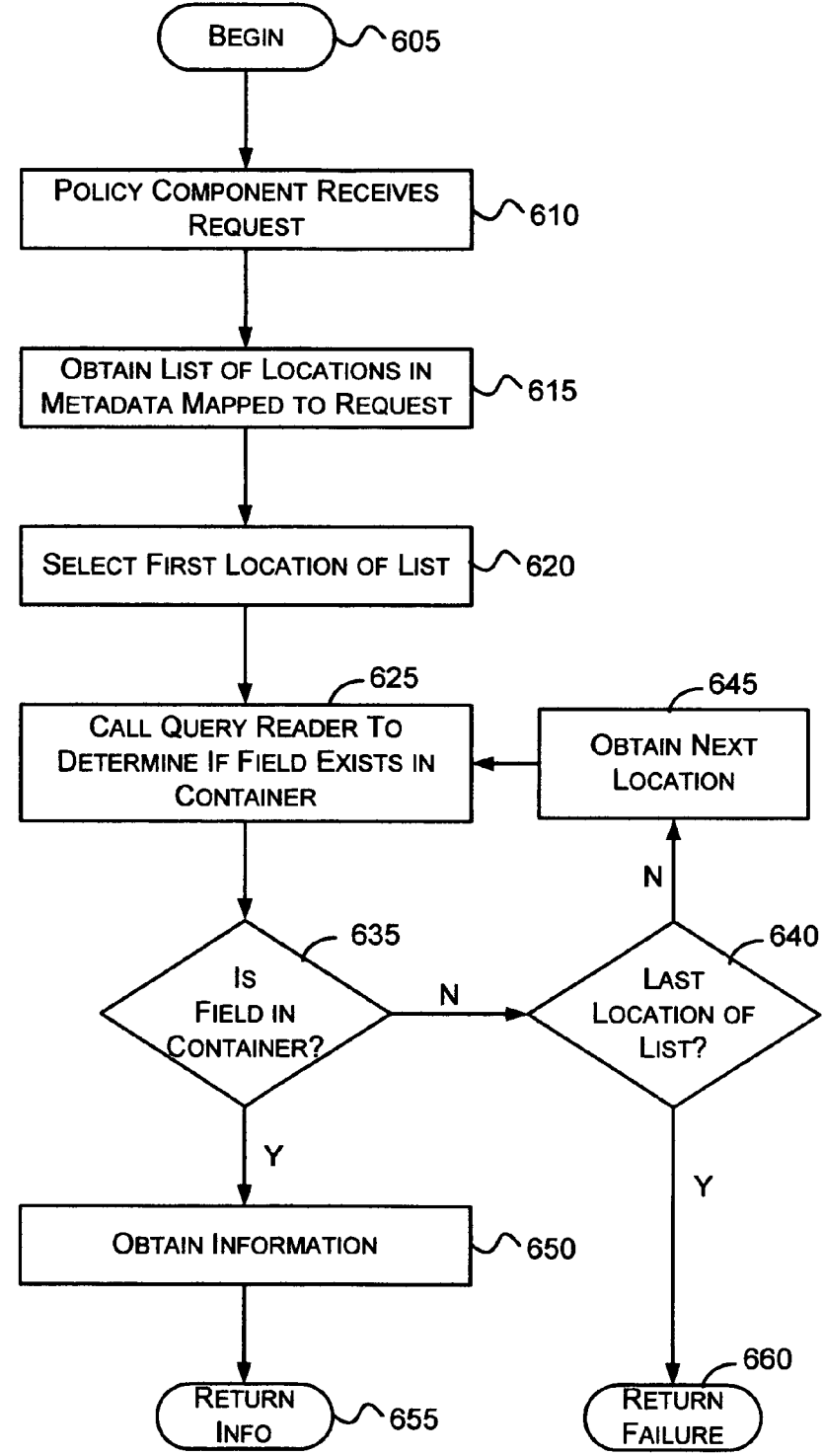
FIG. 6 is a flow diagram that generally represents actions corresponding to block 530 of FIG. 5 that may occur when a policy component obtains information from a container in accordance with various aspects of the invention.

At block 530, the information is obtained from the policy component as described in more detail in conjunction with FIG. 6.

At block 535, the query reader returns the information that either it found or that the policy component found.

At block 540, the actions end.

FIG. 6 is a flow diagram that generally represents actions corresponding to block 530 of FIG. 5 that may occur when a policy component obtains information from a container in accordance with various aspects of the invention. At block 605, the actions begin.

At block 610, the policy component receives the request which includes the non fully-qualified path. At block 615, the policy component obtains a list of locations in the metadata mapped to the path. The policy component may do this by consulting a rules database and obtaining a list of possible locations therefrom. This list of possible locations may include an entry for each type of metadata the policy component understands. For example, in response to a request including a non fully-qualified path of "author", the following locations (which are fully-qualified paths) may be obtained:

/ifd/exif/author
/xmp/exif/author; and
/iptc/author

At block 620, the first location is selected. At block 625, the policy component calls the query reader. Other decoders may be instantiated, if needed, to interpret metadata indicated by the location.

At block 635, a determination is made as to whether the field is included in the container. If the field is included in the container, the actions continue at block 650; otherwise, the actions continue at block 640.

At block 640, a determination is made as to whether the last location of the list has been reached. If not, the actions continue at block 645; otherwise, the actions continue at block 660.

At block 645, the next location of the list is obtained. Then the actions associated with blocks 625 and 635 are repeated. The actions associated with blocks 625-645 continue until the field is found or all locations have been searched and the field is not found.

At block 650, the information from the field is obtained. At block 655, the information is returned to the query reader.

At block 660, a failure return code may be returned to the query reader.

Figure 7:
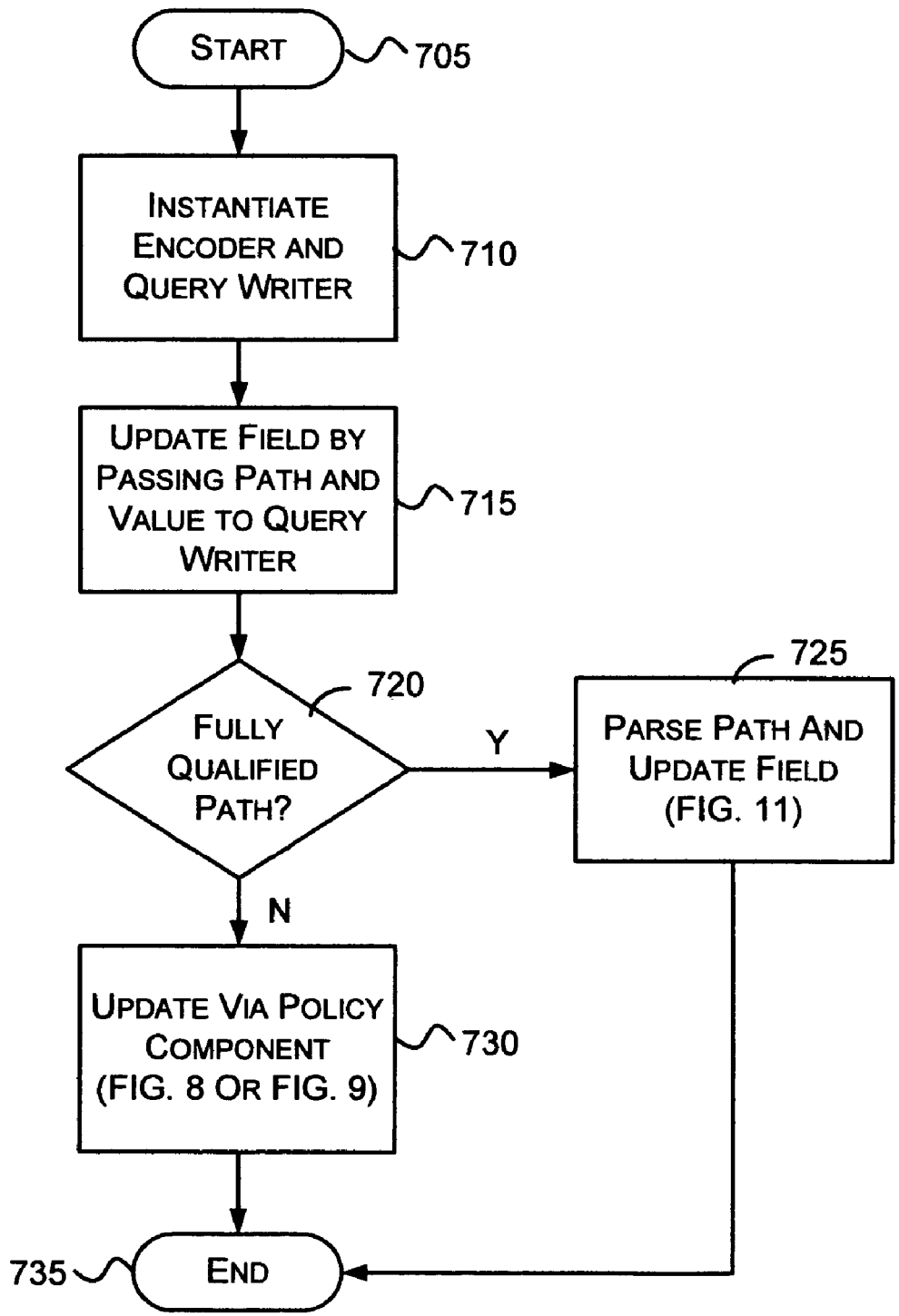
FIG. 7 is a flow diagram generally representing exemplary actions that may occur in updating metadata information in accordance with various aspects of the invention.

FIG. 7 is a flow diagram generally representing exemplary actions that may occur in updating metadata information in accordance with various aspects of the invention. At block 705, the actions begin.

At block 710, an encoder and query writer are instantiated (if they do not exist). For example, referring to FIG. 2, the requesting component 210 instantiates the encoder by calling the codecs component 215 and then instantiates the query writer 330 of FIG. 3B by calling the encoder 325.

At block 715, the component requests that a field be updated by passing a path and value to the query writer. At block 720, the query reader determines if the path is a fully-qualified path, and, if so, the actions continue at block 725. If the path is a non fully-qualified path, processing branches to block 730.

At block 725, the query writer parses the path and updates a field with the value as described in more detail in conjunction with FIG. 11.

Figure 8:
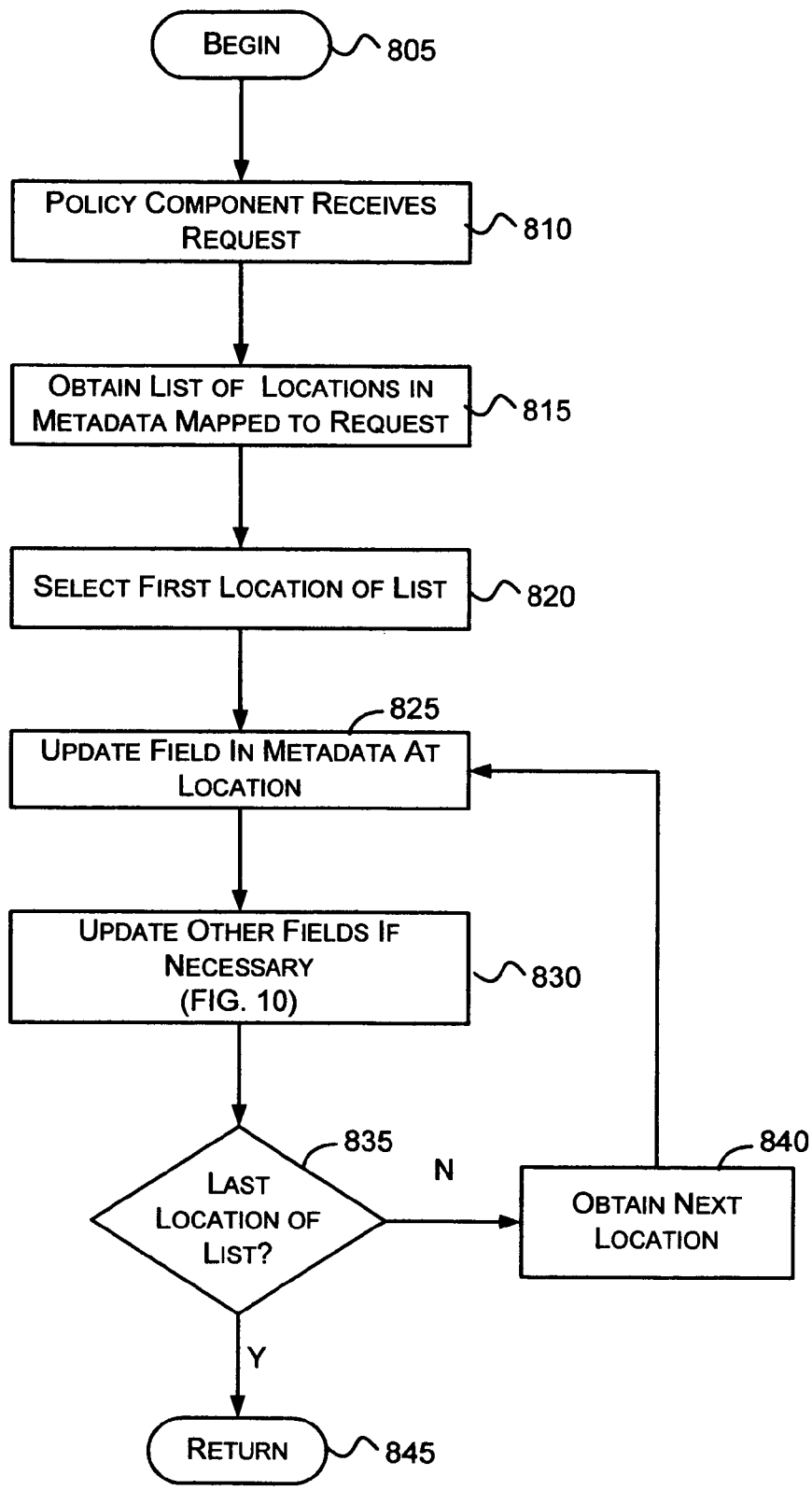
FIGS. 8 and 9 are flow diagrams corresponding to block 730 of FIG. 7 that generally represent actions that may occur when a policy component updates fields in a container in accordance with various aspects of the invention.
Figure 9:
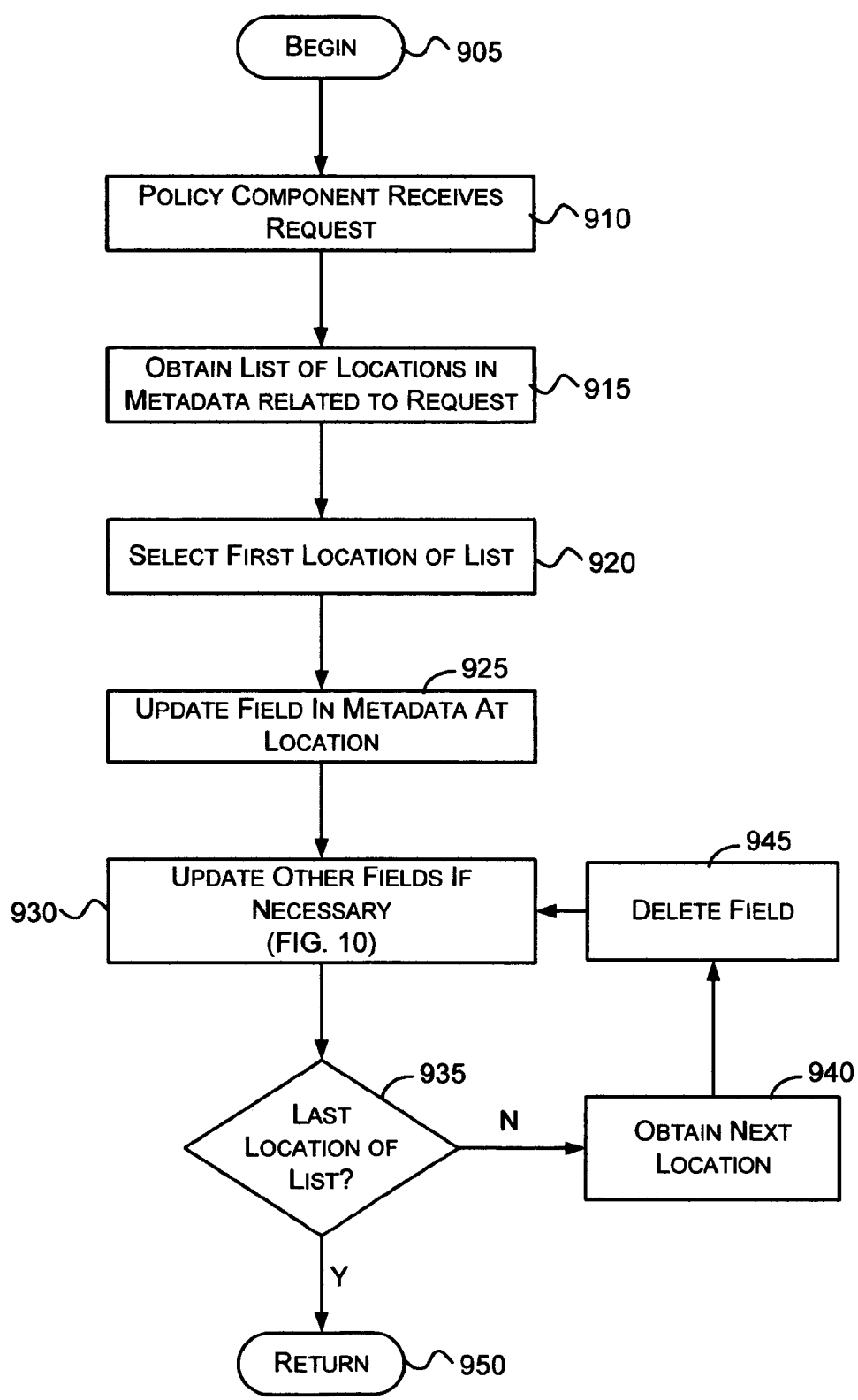
Figure 10:
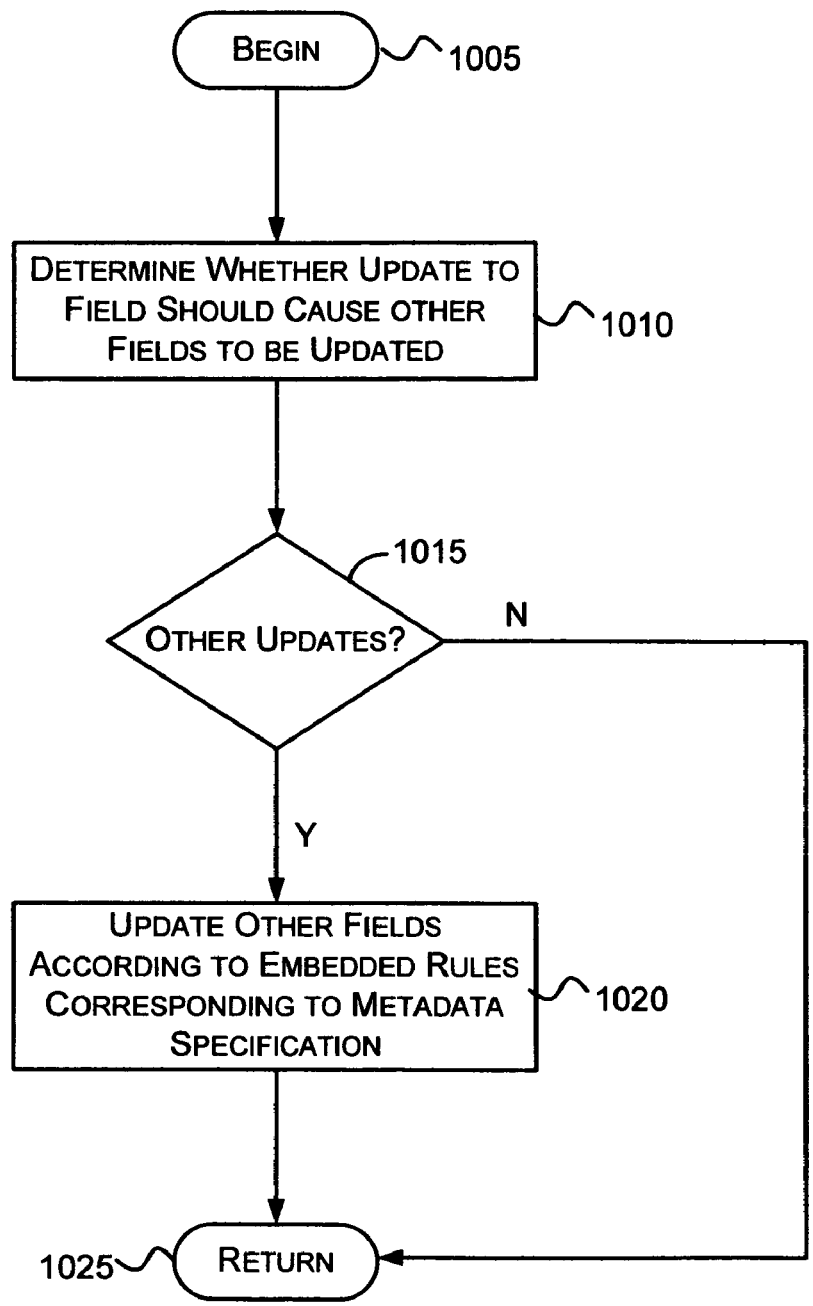
FIG. 10 is a flow diagram that generally represents actions corresponding to block 830 of FIG. 8 and block 930 of FIG. 9 that may occur in updating other fields according to a metadata specification in accordance with various aspects of the invention.

At block 730, the policy component may update metadata as described in more detail in conjunction with FIGS. 8-10.

At block 735, the actions end.

FIGS. 8 and 9 are flow diagrams corresponding to block 730 of FIG. 7 that generally represent actions that may occur when a policy component updates fields in a container in accordance with various aspects of the invention. In the embodiment represented by FIG. 8, mapped fields in all metadata of which the policy component is aware are updated in response to an instruction to update metadata corresponding to a particular non fully-qualified path (e.g., "Author"). In the embodiment represented by FIG. 9, a master field in a master metadata type is updated while fields in other metadata types are deleted. The actions associated with FIG. 10 may be performed, for example, if fields other than the updated field also need to be updated as specified by a metadata specification.

Turning to FIG. 8, at block 805, the actions begin.

At block 810, the policy component receives the request which includes the non fully-qualified path. At block 815, the policy component obtains a list of locations in the metadata mapped to the path. The policy component may do this by consulting a rules database and obtaining a list of possible locations therefrom. This list of possible locations may include an entry for each type of metadata the policy component is able to interpret.

At block 820, the first location is selected. At block 825, the policy component may call a query writer, if needed, to update fields in the metadata. Other encoders and query writers may be instantiated, if needed, to update fields in the metadata indicated by the location. In another embodiment, the field in the metadata is updated only if it already exists in the metadata.

At block 825, the field indicated by the location is updated. If the field does not exist, the field may be created and set to the value; otherwise, the field may be updated with the value.

At block 830, other fields may be updated in response to updating the field as described in more detail in conjunction with FIG. 10. These other fields may be updated to comply with a specification of the metadata that applies to the field that was updated.

At block 835, a determination is made as to whether the the last location of the list has been reached. If so, the actions continue at block 845; otherwise, the actions continue at block 840.

At block 840, the next location of the list is obtained. Then the actions associated with blocks 825-830 are repeated. The actions associated with blocks 825-840 may repeat until the fields have been updated for all locations of the list. This essentially keeps the fields in the various metadata consistent.

At block 845, the actions end.

Turning to FIG. 9, at block 905, the actions begin.

At block 910, the policy component receives the request which includes the non fully-qualified path. At block 915, the policy component obtains a list of locations in the metadata mapped to the path. The policy component may do this by consulting a rules database as described previously. The rules database may include one set of mappings for reading metadata and another set of mappings for writing metadata. Alternatively, the same set of mappings may be used for reading and writing metadata.

At block 920, the first location is selected. The mappings may be organized such that the first one listed is the field in the master metadata type. Thus, in one embodiment, selecting the first location, selects the master field. The policy component may call a query writer, if needed, to update fields in the metadata. Other encoders and query writers may be instantiated, if needed, to update fields in the metadata indicated by the location.

At block 925, the field indicated by the location is updated. If the field does not exist, the field may be created and set to the value; otherwise, the field may be updated with the value.

At block 930, other fields may be updated in response to updating the field as described in more detail in conjunction with FIG. 10. These other fields may be updated to comply with a specification of the metadata applying to the field that was updated.

At block 935, a determination is made as to whether the last location of the list has been reached. If so, the actions continue at block 950; otherwise, the actions continue at block 940.

At block 940, the next location of the list is obtained. At block 945, the field associated with the next location is deleted. Then the actions associated with blocks 930-935 are repeated. The actions associated with blocks 930-935 may be repeated each time a field is deleted at block 945 to update other metadata in response to the deleted field in accordance with one or more metadata specifications.

At block 950, the actions end.

FIG. 10 is a flow diagram that generally represents actions corresponding to block 830 of FIG. 8 and block 930 of FIG. 9 that may occur in updating other fields according to a metadata specification in accordance with various aspects of the invention. At block 1005, the actions begin.

At block 1010, a determination is made as to whether to update other fields in response to a field that has already been updated. For example, a metadata specification may specify that one or more other fields be updated when a particular field is updated. Rules corresponding to the specification may be encoded in the rules database 225 of FIG. 2, for example. A policy component may obtain these rules when determining whether other fields need to be updated.

At block 1015, if other fields need to be updated, the actions continue at block 1020; otherwise, the actions continue at block 1025.

At block 1020, the other fields are updated according to rules embedded in the rules database.

At block 1025, the actions cease.

In reading or updating a field, the policy component may call a codecs component and pass one or more fully-qualified paths thereto. In response thereto, existing or newly instantiated encoder/writer or decoder/reader pairs may be used to read or update various metadata. FIG. 11 is a flow diagram corresponding to block 525 of FIG. 5 and block 725 of FIG. 7 generally representing actions that may occur in reading or updating metadata via fully-qualified path. At block 1105, the actions begin.

At block 1110, the first part of a fully-qualified path is examined. For example, if a path comprises "/ifd/exif/{150}," "ifd" is examined. If a metadata item (e.g., decoder/query reader pair or encoder/query writer pair) exists to read or update metadata in IFD format, this metadata item may then be used to traverse the metadata. Otherwise, a new metadata item may be created.

At block 1115, a determination is made as to whether the examined part is the last part of the path. If so, the actions continue at block 1120; otherwise, the actions continue at block 1130. For example, if the selected part is "{150}", then processing would branch to block 1120.

At block 1120, the field in the metadata is updated or read as requested and a success return code may be returned at block 1125.

At block 1130, the part of the path is mapped to a metadata globally unique identifier (GUID). A metadata GUID may be associated with a particular metadata type and may uniquely identify the metadata type.

At block 1135, the metadata block corresponding to the examined part of the path is found. This may be done by passing the GUID to an encoder or decoder and asking if a metadata block corresponding to the GUID exists in the container.

At block 1140, a determination is made as to whether the metadata block exists in the container. If so, processing branches to block 1150; otherwise, processing branches to block 1145.

At block 1145, a failure code may be returned. In addition, in cases where there is a request to create a field, the metadata block may be created together with the field and a code other than failure returned.

At block 1150, a metadata block reader or writer may be created to read the metadata block corresponding to the GUID.

At block 1155, the next part of the path is examined. The actions associated with blocks 1115, 1130, 1140, 1150, and 1155 may continue until the last part of the path is examined.

Figure 12:
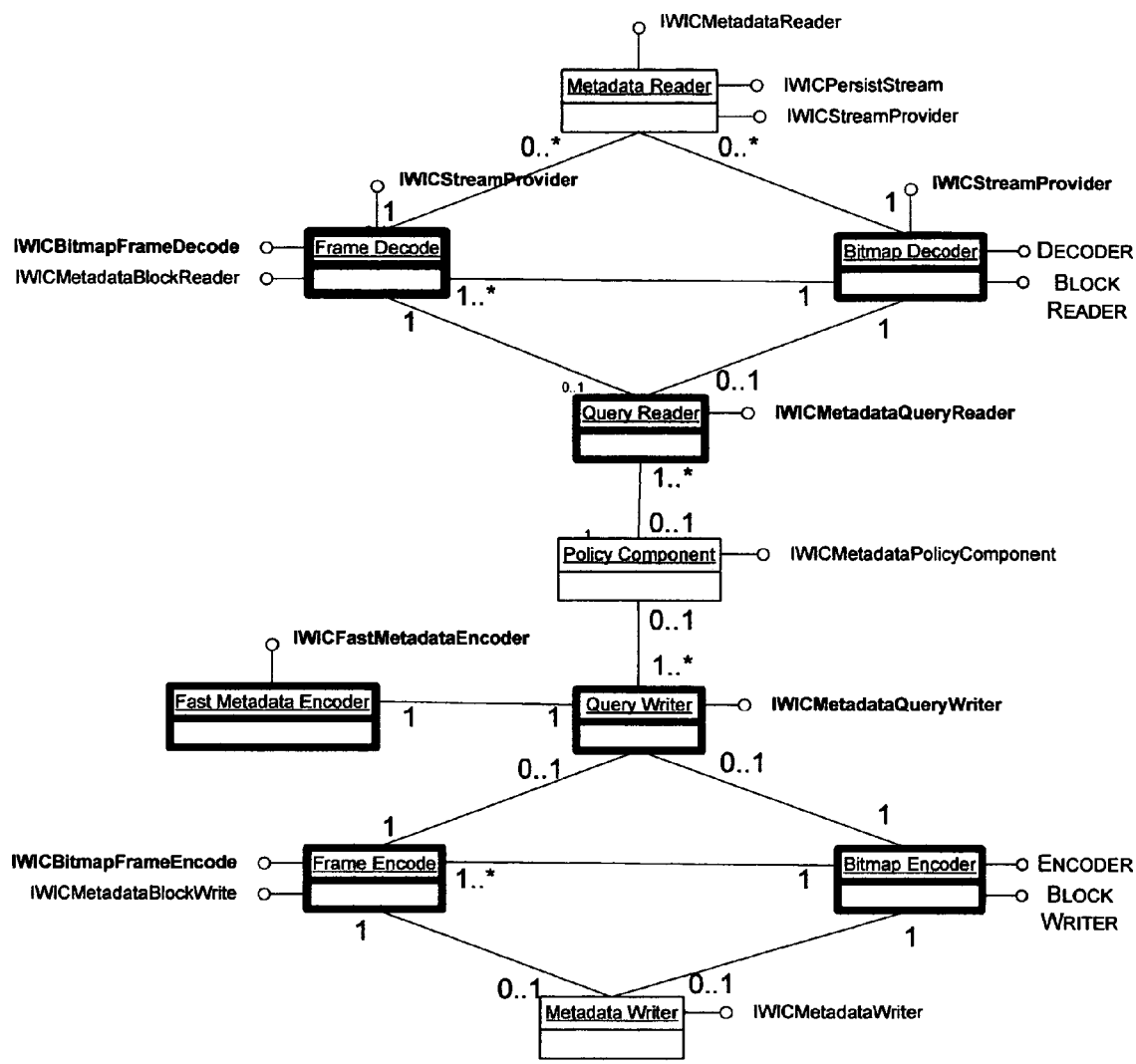
FIG. 12 is an exemplary class diagram representing exemplary interfaces of components in accordance with various aspects of the invention.

FIG. 12 is an exemplary class diagram representing exemplary interfaces of components in accordance with various aspects of the invention. As can be seen, a policy component may interact with one or more query readers and one or more query writers. It will be recognized that the names and interfaces provided by each component are exemplary and that other names and interfaces may be provided without departing from the spirit or scope of the present invention.

A policy component may implement the following exemplary interface to update metadata by non fully-qualified path (e.g., pwzName):

IWICMetadataPolicyComponent : IUnknown

```
{
    virtual HRESULT STDMETHODCALLTYPE Initialize(
        /* [in] */ IWICMetadataQueryReader *pIQueryReader)
        PURE;
    virtual HRESULT STDMETHODCALLTYPE
    GetMetadataByName(
        /* [in] */ LPCWSTR pwzName,
        /* [in, out] */ PROPVARIANT *pvarValue) PURE;
    virtual HRESULT STDMETHODCALLTYPE
    SetMetadataByName(
        /* [in] */ LPCWSTR pwzName,
        /* [in] */ const PROPVARIANT *pvarValue) PURE;
    virtual HRESULT STDMETHODCALLTYPE
    RemoveMetadataByName(
        /* [in] */ LPCWSTR pwzName) PURE;
}
```

The policy component may use the metadata block reader or writer it was initialized with to navigate the metadata hierarchy.

Although various aspects of the invention have been described in the context of images, it will be recognized that the principles contained herein may also be applied to other files that have metadata associated with them without departing from the spirit or scope of the present invention.

As can be seen from the foregoing detailed description, there is provided a method and system for reading the various pieces of information contained in various metadata associated with a file and determining which one takes priority and updating the metadata to keep it consistent. While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing environment including a data file and a plurality of differently formatted portions of metadata corresponding to the data file, each differently formatted portion of metadata including a plurality of metadata fields comprising metadata elements corresponding to the data file, a computer-readable storage medium having thereon computer-executable instructions that, when executed by one or more processors of a computing system, cause the computing system to perform a method for determining which metadata format to return when one or more fields of metadata elements for the data file are to be accessed, the method comprising:

receiving a request for a metadata field that corresponds to the data file, the data file having a plurality of corresponding differently formatted metadata elements formatted at least in a first and a second different format type;

referring to metadata priority data corresponding to the requested metadata field that indicates which metadata element format receives priority for the requested metadata field;

determining that metadata elements of the first format type are to be returned according to the metadata priority data; and based on the determination, returning the metadata elements from the metadata field having the first format type, wherein locations in the metadata that map to a path parameter are obtained and wherein at least one output corresponds to one of the locations.

2. The computer-readable storage medium of claim 1, further comprising obtaining locations in the metadata that map to the path parameter comprises using the non fully-qualified path as a key to find the locations in a repository.

3. The computer-readable storage medium of claim 2, further comprising determining the one of the locations by finding a first one of the locations that exists in the metadata.

4. The computer-readable storage medium of claim 3, wherein the locations are stored in a repository in an order of preference and searched in the order to find the first one of the locations that exists in the metadata.

5. The computer-readable storage medium of claim 1, wherein the request includes a path parameter.

6. The computer-readable storage medium of claim 5, wherein the path parameter comprises a non fully-qualified path.

7. In a computing environment including a data file and a plurality of differently formatted portions of metadata corresponding to the data file, each differently formatted portion of metadata including a plurality of metadata fields comprising metadata elements corresponding to the data file, a method for determining which metadata format to return when one or more fields of metadata elements for the data file are to be accessed, the method comprising:

receiving a request for a metadata field that corresponds to the data file, the data file having a plurality of corresponding differently formatted metadata elements formatted at least in a first and a second different format type;

referring to metadata priority data corresponding to the requested metadata field that indicates which metadata element format receives priority for the requested metadata field;

determining that metadata elements of the first format type are to be returned according to the metadata priority data; and updating based on the determination, returning the metadata elements from the metadata field having the first format type, wherein locations in the metadata that map to a path parameter are obtained and wherein at least one output corresponds to one of the locations.

8. The method of claim 7, wherein the request comprises a path that does not explicitly identify a location in the metadata to update.

9. The method of claim 8, wherein the locations are ordered and further comprising updating the metadata at a first location in the metadata and deleting all other fields indicated by the locations.

10. The method of claim 7, wherein at least some of the metadata priority data is stored in a repository that is accessed when updating the fields at the other locations.

11. The method of claim 7, wherein the metadata priority data is stored in a rules database.

12. The method of claim 7, further comprising updating the metadata fields with appropriate metadata elements determined in accordance with the metadata priority data such that the metadata stays consistent.

13. In a computing environment including a data file and a plurality of differently formatted portions of metadata corresponding to the data file, each differently formatted portion of metadata including a plurality of metadata fields comprising metadata elements corresponding to the data file, an apparatus, comprising:
- a receiving component configured to receive a request for a metadata field that corresponds to the data file, the data file having a plurality of corresponding differently formatted metadata elements formatted at least in a first and a second different format type;
- a referring component configured to refer to metadata priority data corresponding to the requested metadata field that indicates which metadata element format receives priority for the requested metadata field;
- a determining component configured to determine that metadata elements of the first format type are to be returned according to the metadata priority data; and
- a returning component configured, based on the determination, to return the metadata elements from the metadata field having the first format type, wherein locations in the metadata that map to a path parameter are obtained and wherein at least one output corresponds to one of the locations.

14. The apparatus of claim 13, further comprising a metadata reader arranged to read data formatted in one of the formats, wherein the policy component is further arranged to communicate with the metadata reader when reading metadata.

15. The apparatus of claim 13, further comprising a metadata writer arranged to update data formatted in one of the formats, wherein the policy component is further arranged to communicate with the metadata reader when updating metadata.

16. The apparatus of claim 13, further comprising determining which fields to read or update in satisfying the request.

17. the apparatus of claim 16, further comprising a repository arranged to store mappings that map information included in the request to locations in the metadata corresponding to the request.

18. The apparatus of claim 17, wherein determining which fields to read in satisfying the request comprises obtaining the mappings from the repository and finding a first one of the locations for which metadata exists.

19. The apparatus of claim 17, wherein determining which fields to update in satisfying the request comprises obtaining the mappings from the repository and updating a field corresponding to each location.

20. The apparatus of claim 17, wherein determining which fields to update in satisfying the request comprises obtaining the mappings from the repository, updating a single field corresponding to a location, and deleting the other fields corresponding to other locations.

* * * * *